US007474313B1

(12) United States Patent
Bittel et al.

(10) Patent No.: US 7,474,313 B1
(45) Date of Patent: Jan. 6, 2009

(54) APPARATUS, METHOD, AND SYSTEM FOR COALESCED Z DATA AND COLOR DATA FOR RASTER OPERATIONS

(75) Inventors: Donald A. Bittel, San Jose, CA (US); Dorcas T. Hsia, Sunnyvale, CA (US); David Kirk McAllister, Holladay, UT (US); Jonah M. Alben, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 354 days.

(21) Appl. No.: 11/304,160

(22) Filed: Dec. 14, 2005

(51) Int. Cl.
*G09G 5/39* (2006.01)
*G06F 12/02* (2006.01)
*G06T 15/40* (2006.01)

(52) U.S. Cl. ........................ 345/531; 345/544; 345/422

(58) Field of Classification Search ................. 345/530, 345/531, 544, 549, 418–419, 421–422, 581–582, 345/589
See application file for complete search history.

(56) References Cited

U.S. PATENT DOCUMENTS 4,954,819 A 9/1990 Watkins
5,061,919 A 10/1991 Watkins
5,937,204 A * 8/1999 Schinnerer .................. 345/531
6,724,396 B1 * 4/2004 Emmot et al. ............... 345/587
7,286,134 B1 * 10/2007 Van Dyke et al. ........... 345/544

OTHER PUBLICATIONS

James Van Dyke, "System and Method for Packing Data in a Tiled Graphics Memory", U.S. Appl. No. 10/740,229, filed Dec. 17, 2003.

* cited by examiner

*Primary Examiner*—Xiao M Wu
*Assistant Examiner*—Tize Ma
(74) *Attorney, Agent, or Firm*—Cooley Godward Kronish LLP

(57) ABSTRACT

A graphics system coalesces Z data and color data for a raster operations stage. The Z data and color data are stored in a memory aligned tile format. In one embodiment, rendering modes in which the tile does not have a data capacity corresponding to Z data or color data for a whole number of pixels have data for at least one pixel split across entries to improve packing efficiency. Rendering modes having a number of bits for Z data or color data that does not equal a power of two such as 24 bits, 48 bits, and 96 bits, may be implemented with a high packing efficiency in tile formats having a data capacity corresponding to a power of 2 bits.

17 Claims, 5 Drawing Sheets

APPARATUS, METHOD, AND SYSTEM FOR COALESCED Z DATA AND COLOR DATA FOR RASTER OPERATIONS

FIELD OF THE INVENTION

The present invention is generally related to techniques to store and access data for use in a raster operations (ROP) stage of a graphics pipeline.

BACKGROUND OF THE INVENTION

A graphics systems typically utilizes a graphics pipeline that includes a raster operations (ROP) stage to perform raster operations on pixel data. A ROP stage commonly performs several different operations on pixel data. These include performing Z depth test operations to determine visible pixels, discarding occluded pixels, and performing read/modify/write operations with a Z-buffer. A ROP may also perform frame buffer color blending operations such as combining colors, performing anti-aliasing operations, and read/modify/write operations with a color buffer.

A ROP stage performs a large number of memory accesses in order to perform raster operations on Z data and color data. The efficiency with which memory accesses can be performed is thus of concern in designing a graphics system.

There is increasing interest in the graphics industry in utilizing different rendering modes for specific applications. A rendering mode may, for example, have specified formats for Z data and color data. Certain game modes, for example, do not require certain types of data for rendering certain types of surfaces and/or require data of the same precision or type. Consequently, the number of bits required for Z data and color data may depend upon the rendering mode. However, in a graphics system supporting different rendering modes one or more of the rendering modes may not be efficient in regards to performing memory accesses.

Additionally, one or more of the rendering modes may not pack data efficiently. For example, U.S. patent Ser. No. 10/740,229, entitled "System and method for packing data in a tiled graphics memory," commonly assigned to the assignee of the present invention, discloses an embodiment for packing 32 bits per pixel into different portions of a tile, where the 32 bits include 8 bits of stencil data and 24 bits of Z data per pixel. However, the tile format disclosed in U.S. patent Ser. No. 10/740,229 is inefficient in regards to packing efficiency when only 24 bit Z data is required, since only three-fourths of the storage capacity of the tile format is utilized (e.g., 24 bits/32 bits=¾). The contents of U.S. patent Ser. No. 10/740,229 is hereby incorporated by reference.

Therefore, in light of the above described problems the apparatus, system, and method of the present invention was developed.

SUMMARY OF THE INVENTION

A graphics system coalesces Z data and color data for use by a raster operations (ROP) stage. Z data is coalesced into coalesced Z data entries, where each coalesced Z data entry has a format for storing Z data for a plurality of pixels. Color data is coalesced into coalesced color data entries, where each coalesced color data entry has a format for storing color data for a plurality of pixels. In one embodiment the coalesced Z data entries and coalesced color data entries are memory aligned to contiguous regions of memory to improve transfer access efficiency. In one embodiment an associated Z data tile format has a first data size for storing Z data for a plurality of pixels memory aligned to a first contiguous region of memory. For a rendering mode in which the Z data tile format has a pixel data capacity that does not correspond to Z data for a whole number of pixels the pixel data coalescing unit splits Z data across entries to improve packing efficiency. Additionally, in one embodiment an associated color data tile format has a second data size for storing color data for a plurality of pixels memory aligned to a second contiguous region of memory. For a rendering mode in which the color data tile format has a pixel data capacity that does not correspond to color data for a whole number of pixels the pixel data coalescing unit splits color data across entries to improve packing efficiency. Exemplary applications include supporting different rendering modes that require a number of bits per pixel not equal to a power of two, such as 24 bits, 48 bits, or 96 bits per pixel.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
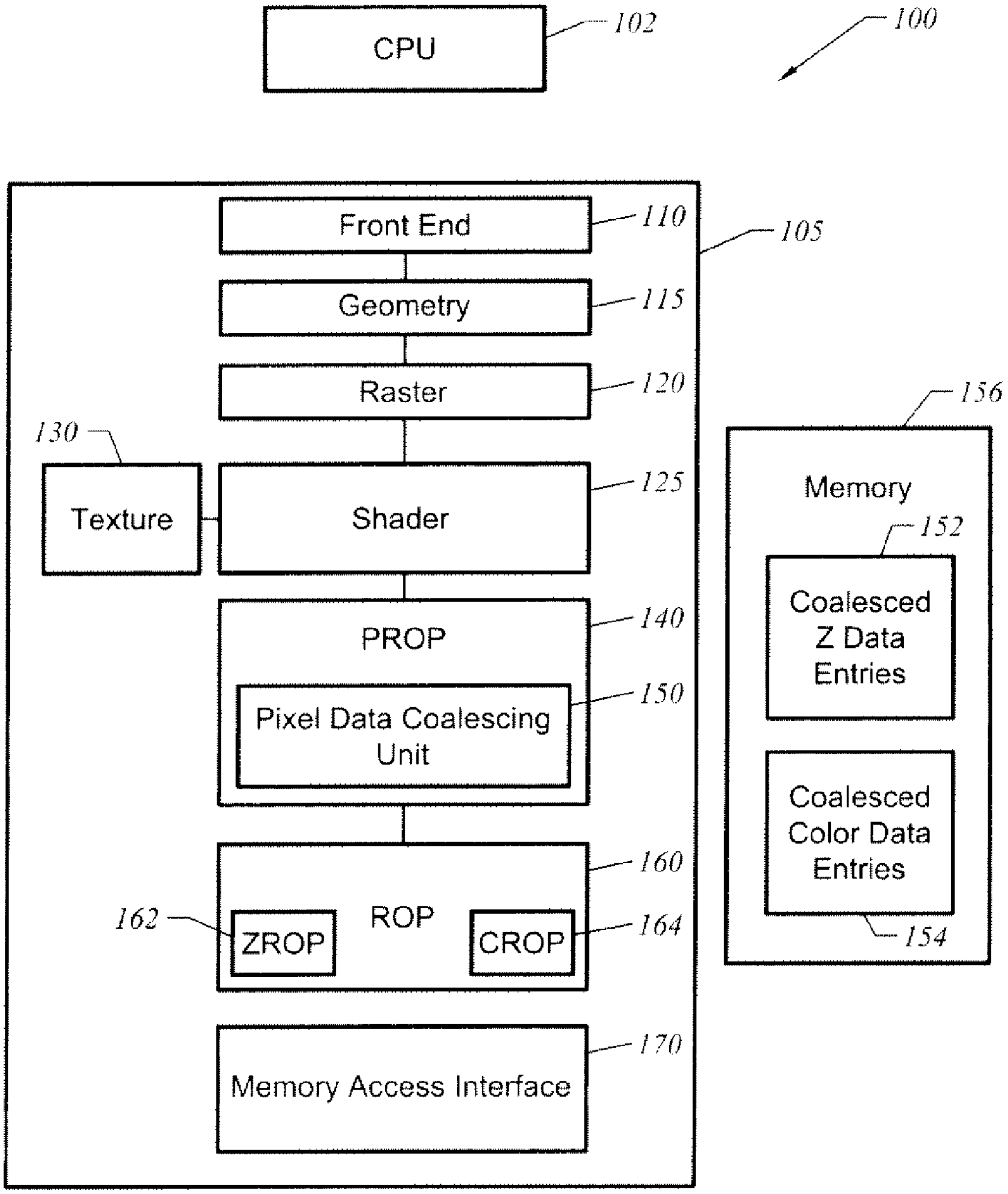
FIG. 1 illustrates a graphics system in accordance with one embodiment of the present invention.

FIG. 1 illustrates a portion of a graphics system 100 in accordance with one embodiment of the present invention. A graphics pipeline 105 includes pipeline stages for generating an initial set of Z depth data and color data for pixels. Graphics pipeline 105 may, for example, include a front end 110 to receive commands from a central processing unit (CPU) 102, a geometry stage 115 to generate primitives, raster stage 120 to convert primitives into fragments, and a shader stage 125 and texture unit 130 to generate pixel data. The function of stages in a graphics pipeline is well known in the graphics art and is, for example, described in various standards, such as the OpenGL® standard. Moreover, many variations in the design of graphics pipelines are known in the graphics arts.

A pixel data coalescing unit 150 receives a stream of pixel data. In one embodiment, pixel data coalescing unit 150 is part of a pre-raster operations (PROP) unit 140. PROP unit 140 may be a separate stage or be incorporated as part of a raster operations (ROP) stage 160 that it serves.

Pixel data coalescing unit 150 coalesces Z data for pixels into coalesced Z data entries 152 and coalesced color data entries 154 which are stored in a memory 156. Each coalesced Z data entry includes Z data for a plurality of pixels. Similarly, each coalesced color data entry includes color data for a plurality of pixels. Memory 156 may, for example, be a random access memory. Memory 156 may be either a permanent memory or a buffer memory, depending upon the implementation.

The coalescing process takes data from a number of pixels and packs it into fields of an entry, where the entry has a memory format that may be efficiently accessed during subsequent processing steps, such as a tiled memory format. An individual coalesced Z data entry and coalesced color data entry may correspond to data for a linear or two-dimensional region of pixels to increase coherence and improve memory access efficiency.

The coalesced Z data entries 152 and coalesced color data entries 154 are preferably arranged into a memory aligned memory format, such as a tiled memory format. The memory format is further preferably selected to be consistent with an efficient memory transfer size for accessing memory 156. For a memory 156 organized as pages, columns, and banks, the memory format is preferably organized to be aligned to a contiguous region of memory (e.g., aligned to a page of memory) to reduce memory access penalties associated with accessing dispersed regions of memory 156. As an illustrative example, the tile memory format may be designed to permit pixel data to be efficiently stored and accessed from a random access memory (RAM) in which data is stored in pages and referenced by columns and banks. In this embodiment each tile is preferably stored in a memory aligned format, with a high page locality, e.g., each memory access for a single tile maps to a contiguous region of memory corresponding to one page to reduce page crossing that would slow the memory access. Moreover, in one embodiment of a memory aligned format the tile size is preferably selected to be an integer multiple of some minimum memory access size such that tile data may be accessed efficiently from memory using an integer number of memory accesses. In particular, in some memory architectures a minimum memory transfer access size corresponds to an access size for accessing a single memory partition.

ROP stage 160 includes a Z raster operations (ZROP) module 162 and a color raster operations (CROP) module 164. ZROP module 162 utilizes coalesced Z data entries 152 to perform ZROP operations, such as Z-testing to determine visible pixels. CROP module 164 utilizes coalesced color data entries 154 to perform color operations on visible pixels, such as blending operations and anti-aliasing. A memory access interface 170 may be included to facilitate memory accesses to memory 156.

In one embodiment, graphics system 100 supports different rendering modes. A command from CPU 102 may initiate a particular rendering mode. A particular rendering mode requires a certain number of bits reserved for Z data and color data, respectively. The rendering mode may have other attributes, such as whether it requires stencil data and the format in which color data is represented. For example, one rendering mode may require 24 bit Z data and 8 bit stencil data (e.g., 32 bits). However, another rendering mode may require 24 bit Z data but no stencil data. Color data may, for example, require 24 bits to represent red, green, and blue colors with 8 bits per color in a red-green-blue (RGB) format. Consequently one application of the present invention is for a system having a rendering mode corresponding to 24 bit Z data and a rendering mode with 24 bit Z data and 24 bit color data. However, more generally the present invention may be applied to different Z and color data formats. Illustrative examples of different Z and color data formats include 8, 16, 24, 32, 48, and 96 bit Z and color. Note also that different combinations of Z and color data formats are possible, such as 16 bit Z and 16 bit color, 24 bit Z and 16 bit color, 42 bit Z and 16 bit color.

A particular rendering mode may have a specific tiled memory format. An individual rendering mode, may for example, organize a coalesced data entry as a tile data format to store data for a linear arrangement of pixels or a two-dimensional region of pixels. The tile size and arrangement are preferably selected to improve memory access efficiency and reduce the time required to access data from memory.

Figure 2:
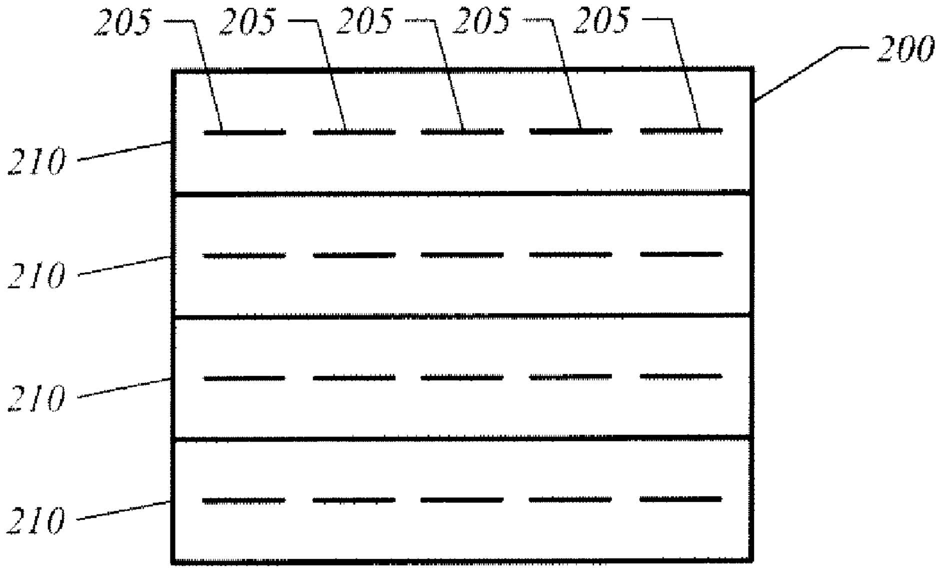
FIG. 2 illustrates an apparatus for coalescing pixel data for use in a raster operations stage in accordance with one embodiment of the present invention.

FIG. 2 illustrates an exemplary tile format 200 for a single coalesced data entry. Tile format 200 includes fields 205 for storing pixel data arranged in different lines 210 of data. The choice of the tile size is governed by a number of considerations, such as memory transfer access size. For example, a PCI-E bus is a packet bus that has eight byte enables per packet. In PCI-E each packet has packet overhead such that the ratio of packet overhead to payload data transfer is optimized when tile data is organized into units that are integer multiples of 8 bytes. Consequently, a tile arranged to permit data transfers in integer multiples of 8 byte chunks improves the efficiency with which tile memory may be accessed via a PCI bus. Thus, the tile format may be selected to have an integer multiple of 8 bytes, such as 64 bytes to facilitate efficient memory transfers. In one embodiment tile format 200 includes four lines 200, each corresponding to 16 bytes, for a total data size of 64 bytes.

In a graphics system 100 supporting different rendering modes, the number of bits per pixel required for Z data and color data may depend upon the rendering mode. Note also that tile formats of interest are likely to have a data capacity in bytes corresponding to a power of two number of bits. If a tile format has a pixel data capacity corresponding to a number of bits which is a power of two, i.e., $2^n$, where n is an integer, then a rendering mode having $2^m$ bits per pixel, where m is an integer, will result in the tile format supporting an exact whole number of pixels, i.e., the tile format will be capable of storing data for $2^{n-m}$ pixels. However, if the rendering mode requires a number of bits per pixel that is not an exact power of 2, such as a rendering mode requiring $3\times 2^k$ bits per pixel, then the tile format will support storage of ⅓ $2^{n-k}$ pixels, which corresponds to a number of pixels plus some fractional portion of one pixel. That is, for one rendering mode having a first number of bits per pixel a particular tile format may support an exact whole number of pixels whereas for another rendering mode having a second number of bits per pixel the tile format may support an integer number of pixels and also have additional pixel data capacity corresponding to a fraction of the bits required for a pixel.

As previously described, the tile size may be governed, in part, by memory transfer consideration such at the tile size being an integer multiple of 8 bytes for a PCI-E bus. The number of pixels that an individual tile corresponds to will depend on the tile size and the number of bits required to represent Z or color data in the selected rendering mode. Thus, the number of lines and fields per line may be dependent upon the rendering mode and whether Z data or color data is being stored. As an illustrative example, a memory format for a single coalesced data entry may correspond to a data size of 64 bytes, such as four lines 210 each having fields 205 for storing 16 bytes per line. Thus in this example if the rendering mode has 32 bit Z (four bytes) then a single entry supports an integer number of pixels (e.g. 16 pixels×four bytes/pixel=64 bytes) because the total data capacity of the tile format is a power of two and 32 bit Z is also a power of two (i.e., $2^5$). However, note that for other selections, such as a 24 bit Z (three bytes) that the coalesced data entry may store data for an integer number of pixels and also a fractional portion of one pixel (e.g., 64 bytes/3 bytes per pixel=31⅓ pixels supported by one entry). This is because 24 bit Z is not a power of two, i.e., $24=3\times 2^3$. Consequently, in some rendering modes the most efficient packing arrangement requires splitting pixel data for at least one pixel across several coalesced data entries, such as two successive coalesced Z data entries or two successive coalesced color data entries. In the above-described example, 24 bit Z data is most efficiently packed into a 64 byte tile format by splitting pixel data for at least one pixel across several coalesced data entries in order to fully utilize the capacity of the tile format. Note that a similar situation occurs for other Z and color data rendering modes that are also not a power of two, such as 48 bit ($3\times2^4$) or 96 bit ($3\times2^5$) Z or color data rendering modes.

Figure 3:
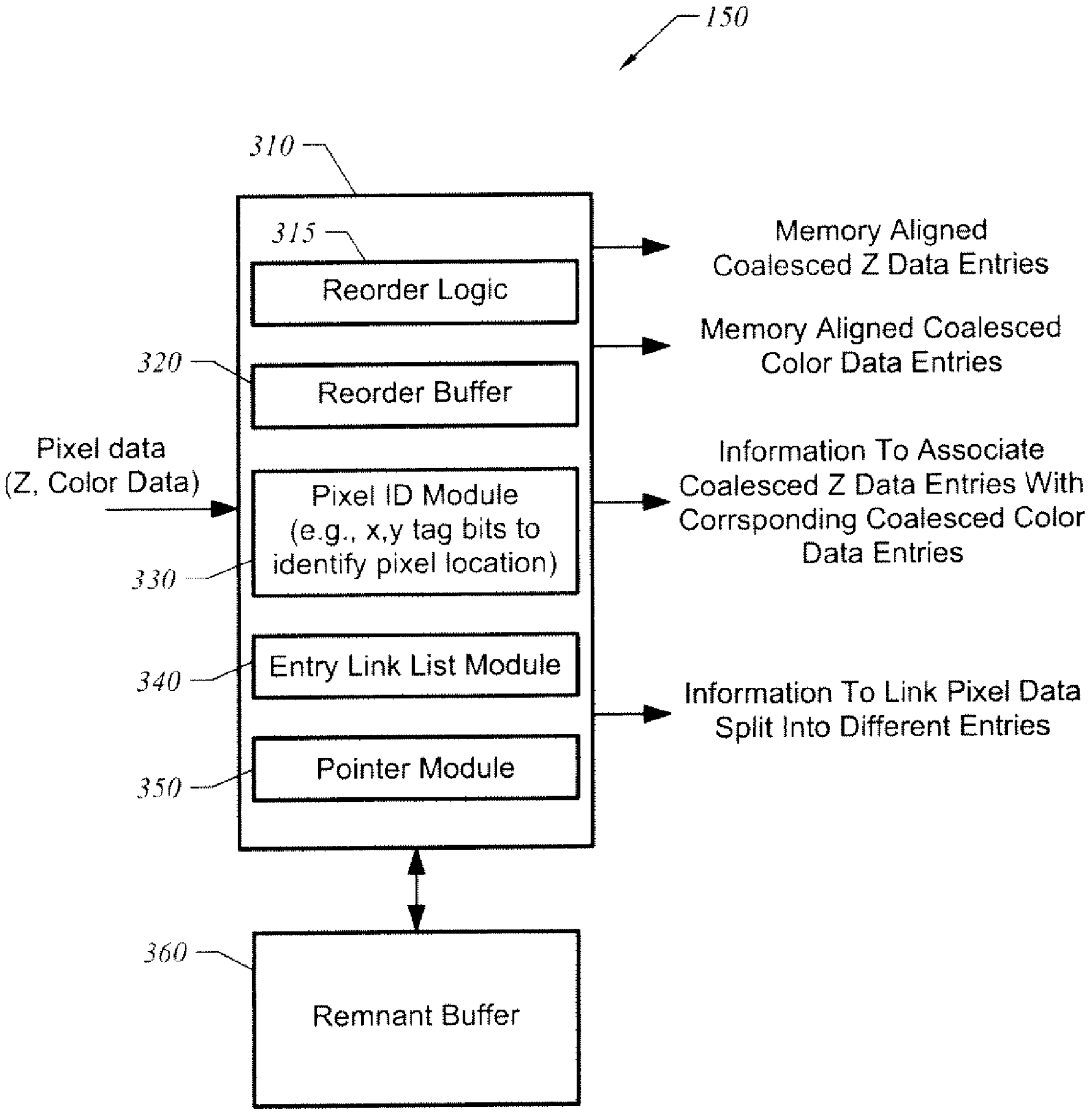
FIG. 3 illustrates a data structure format for a coalesced data entry.

FIG. 3 illustrates in more detail components of a pixel data coalescing unit 150 in accordance with one embodiment of the present invention. A stream of pixel data is received by reorder module 310. The input pixel data includes Z depth data and color data. Reorder module 310 includes reorder logic 315 and a reorder buffer 320 to provide for temporary storage of pixel data to accumulate data for each coalesced entry. A pixel ID module 330 generates information to identify pixel location and may, for example, comprise a tag module to generate tag bits to identify (x,y) pixel locations. An entry link list module 340 generates information to link pixel data split between two entries ("data splits"). Each portion of the pixel data that is split between two entries is known as a "remnant." A remnant buffer 360 is provided to store pixel data of a remnant for inclusion in a subsequent coalesced entry. A pointer module 350 generates data to associate coalesced Z data entries 152 with corresponding color data entries 154 for the same pixels.

The outputs of pixel data coalescing unit 150 include memory aligned coalesced Z data entries, memory aligned coalesced color data entries, information (e.g., pointers) to associate coalesced Z data entries with corresponding coalesced color data entries, and information to link pixel data split into different entries. Note that the information to link remnants and associate coalesced color data entries may be stored in different ways. For example, a coalesce buffer, such as a coalesce buffer for Z data entries (not shown) may store this information in a portion of memory. Note also that some of the information required for linking remnants and associating coalesced Z data entries and coalesced color data entries for corresponding pixels may be inferred by ROP 160 from the rules used by reorder logic 315 to generate the data entries. Consequently, compact bit codes may be sufficient in some implementations to store information for ROP 160 to link remnants and associate coalesced Z data entries and color data entries. In one embodiment a bit code (e.g., 0, 1, 2, 3 . . . ) is used to associate remnants in different coalesced data entries 152 or 154. In one embodiment a 2-bit type field in a Z coalesce buffer is used to determine the pixel location within a line of data. In this embodiment a 2-bit color pointer with high/low values may be used to point to corresponding entries in a color coalesce buffer.

Note that reorder module 310 performs several different types of reordering. First, reorder module 310 reorders input pixel data into separate coalesced Z data entries 152 and coalesced color data entries 154. Second, reorder module 310 also efficiently packs input data into a format that is capable of being stored in a contiguous region of memory. The packing may include an ordering selected to minimize splitting of pixel data between coalesced data entries. Reorder module 310 may also perform other optimizations of the order of input data to improve memory access, such as optimizing the arrangement of pixel data within fields 205 of a tile format 200 for a particular implementation of memory 156 and memory access interface 170.

Figure 4:
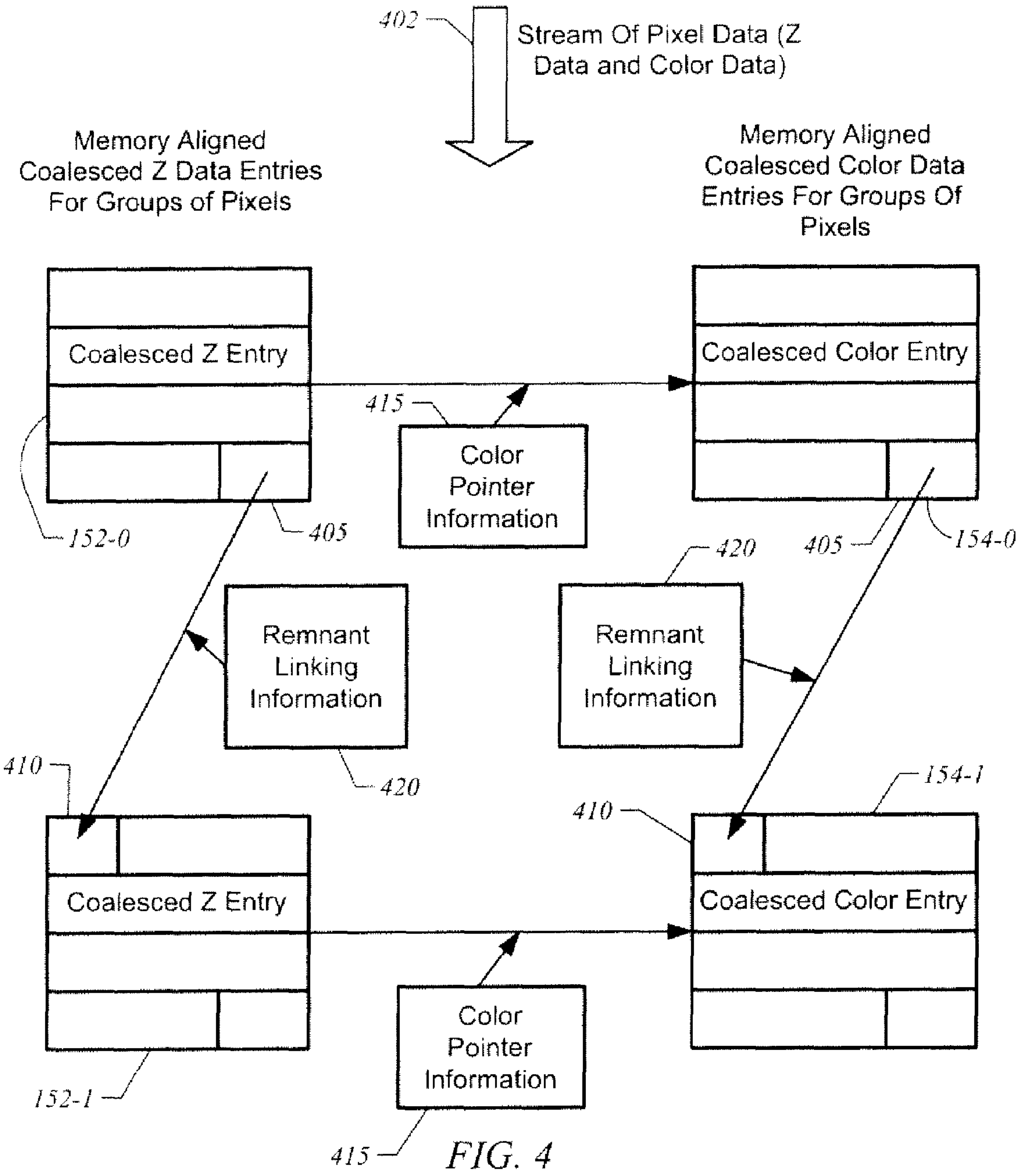
FIG. 4 illustrates a method of generating coalesced Z data entries and coalesced color data entries.

FIG. 4 illustrates the generation of coalesced Z data entries 152 and coalesced color data entries 154. An input stream of pixel data 402 has both Z data and color data for individual pixels. After a sufficient amount of pixel data is accumulated, coalesced Z data entries 152 and coalesced color data entries 154 are generated. Remnants 405 and 410 in successively issued coalesced Z data entries, such as coalesced Z data entries 152-0 and 152-1, may also have associated remnant linking information 420 to either directly or inferentially associate remnants in subsequent processing steps. Color pointer information 415 permits an association to be made between coalesced Z data entries 152 and corresponding coalesced color data entries 154. In one embodiment each coalesced color data entry 154 has the same tile format as the coalesced Z data entry. However, more generally the tile formats do not have to be identical, particularly if Z data and color data require a different number of bits for a particular rendering mode. The input stream of pixel data 402 may correspond to pixel data for a localized region of pixels corresponding to several tiles. For example, depending upon the particular implementation, the coalesced Z data entries 152 and coalesced color data entries 154 may be generated for a pixel region corresponding to a pre-selected number of adjacent tiles selected for efficient processing in ROP 160. As an illustrative example, reordering may be performing for input pixel data for a region corresponding to four adjacent tiles (e.g., entries 0, 1, 2, and 3).

Figure 5:
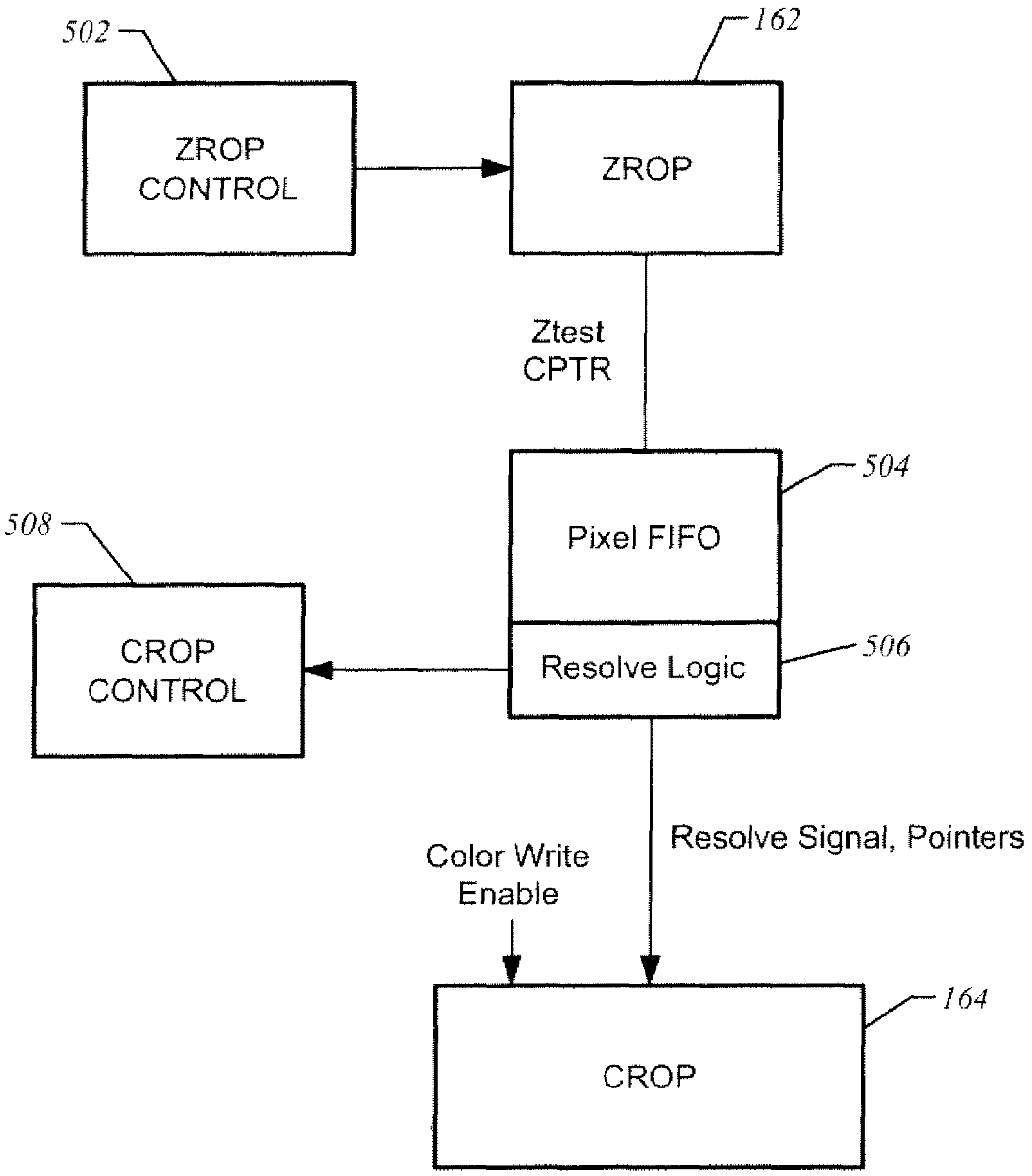
FIG. 5 illustrates a portion of a raster operation stage in accordance with one embodiment of the present invention.

FIG. 5 illustrates in more detail a portion of ROP 160 in accordance with one embodiment of the present invention, with some conventional ROP components omitted for clarity. ZROP module 162 processes coalesced Z data entries 152 and includes a controller 502. ZROP module 162 performs a Z test to compare Z values of a new coalesced Z data entry 152 with Z values for previously observed pixels having the same locations. If a new pixel is below a previous solid pixel, with respect to a view point, it is occluded. If a new pixel is on top of a previous pixel it is generally visible. Occluded pixels are preferably discarded to minimize further processing work. Here, however, the Z test is performed upon Z data which is accessed as memory aligned coalesced Z data entries 152. The (x, y) pixel locations may, for example, be inferred from a bit code and Z testing performed at selected (x, y) sample points to perform a Z test against previously observed coalesced Z data entries at the same sample locations.

In one embodiment, the output of ZROP module 162 for each new coalesced Z data entry 152 is a result of the Z test (Ztest) for the new coalesced Z data entry and pointers to the corresponding coalesced color data entry 154 (CPTR). A pixel Z buffer 504 and resolve logic 506 are used to resolve whether pixels for new coalesced Z data entries are visible. A resolve signal and pointers to color data are sent to CROP module 164. The resolve signal may also be sent to CROP control module 508 as part of the logic to determine whether to enable color writes. That is, a color write to update a color buffer is not performed if the result of the resolve signal indicates that the pixels for the new coalesced Z data entry is occluded. However, if the resolve signal indicates that the pixels for the new coalesced Z data entry are visible, then the CROP module 164 performs color operations using the coalesced color data entry. Note that ZROP 162 and CROP 164 initiate memory accesses to memory aligned coalesced Z data entries 152 and memory aligned coalesced color data entries 154. Thus, memory access operations are performed more efficiently.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for improving memory access of pixel data for a raster operations (ROP) stage of a graphics pipeline, comprising:

a pixel data coalescing unit operative to receive a stream of pixel data and separate Z data and color data;

said pixel data coalescing unit packing Z data into a sequence of coalesced Z data entries with each coalesced Z data entry having an associated Z data tile format having a first data size for storing Z data for a plurality of pixels memory aligned to a first contiguous region of memory, wherein for a rendering mode in which said Z data tile format has a capacity that does not correspond to Z data for a whole number of pixels said pixel data coalescing unit splits Z data across entries to improve packing efficiency;

said pixel data coalescing unit packing color data into a sequence of coalesced color data entries with each coalesced color data entry having an associated color data tile format having a second data size for storing color data for a plurality of pixels memory aligned to a second contiguous region of memory wherein for a rendering mode in which said color data tile format has a capacity that does not correspond to color data for a whole number of pixels said pixel data coalescing unit splits color data across entries to improve packing efficiency; and said pixel data coalescing unit generating information to associate said sequence of coalesced Z data entries and coalesced color data entries in subsequent processing operations performed by said ROP and said pixel data coalescing unit generating information for associating any data splits between entries in subsequent processing operations performed by said ROP;

wherein said pixel data coalescing unit includes:

a reorder module operative to determine an ordering of Z data and color data selected to minimize breaking up pixel data between entries and generate information for associating data splits between successive entries;

a tag module associated with said reorder module to identify pixel locations associated with each data entry;

a link list module generating information to associate pixel information split between coalesced entries; and a pointer module to generate pointers to associate entries for coalesced Z data with corresponding entries for coalesced color data.

2. The apparatus of claim 1, wherein said pixel data coalescing unit packs Z data into coalesced Z data entries for use by said ROP stage in which each coalesced Z data entry has an arrangement of Z data entries with a selected first number of lines and a first number of data fields per line organized to permit a memory aligned memory access of Z data for a selected rendering mode;

said pixel data coalescing unit packs color data into coalesced color data entries for use by said ROP stage, each coalesced color data entry having an arrangement of color data entries with a selected second number of lines and a second number of data fields per line organized to permit memory aligned memory access of color data for said selected rendering mode; and said pixel data coalescing unit generates information for said ROP to associate pixel locations of coalesced Z data entries and coalesced color data entries to perform raster operations.

3. The apparatus of claim 1, wherein at least one rendering mode utilizes a number of bits for Z data for each pixel that is not a power of two and said Z data tile format has a data capacity in bits corresponding to a power of two.

4. The apparatus of claim 3, wherein said at least one rendering mode utilizes a bit size per pixel for Z data from the group consisting of 24 bits, 48 bits, and 96 bits to represent Z data for each pixel.

5. The apparatus of claim 1, wherein at least one rendering mode utilizes a number of bits for color data for each pixel that is not a power of two and said color data tile format has a data capacity in bits corresponding to a power of two.

6. The apparatus of claim 5, wherein said at least one rendering modes utilizes at least one bit size per pixel for color data to represent color data for each pixel from the group consisting of 24 bits, 48 bits, and 96 bits.

7. A graphics system, comprising:

a graphics pipeline to generate pixel data;

a pre-raster operations (PROP) module including a pixel data coalescing unit operative to receive a stream of pixel data from said graphics pipeline, separate Z data and color data, pack Z data and color data into a sequence of separate coalesced Z data entries and coalesced color data entries each memory aligned to contiguous regions of memory, and generate information to associate said sequence of separate coalesced Z data entries and coalesced color data entries in subsequent processing operations;

a raster operations (ROP) stage coupled to said pre-raster operations module, comprising:

a Z raster operations (ZROP) module to perform raster operations on Z data, said ZROP module performing a Z-test utilizing said coalesced Z data entries to generate data to resolve the visibility of pixels; and a color raster operations (CROP) module to perform raster operations on color data, said CROP module receiving an output of said ZROP module and performing color writes utilizing said coalesced color data entries;

wherein for a rendering mode in which a tile format for each Z data entry has a capacity that does not correspond to Z data for a whole number of pixels said pixel data coalescing unit splits Z data across entries to improve packing efficiency and wherein for a rendering mode in which a tile format for each color data entry has a capacity that does not correspond to color data for a whole number of pixels said pixel data coalescing unit splits color data across entries to improve packing efficiency;

wherein said pixel data coalescing unit includes:

a reorder module operative to determine an ordering of Z data and color data selected to minimize breaking up pixel data between entries and generate information for associating data split between successive entries;

a tag module associated with said reorder module to identify pixel locations associated with each data entry;

a link list module generating information to associate pixel information split between coalesced entries; and pointer module to generate pointers to associate entries for coalesced Z data with corresponding entries for coalesced color data.

8. The graphics system of claim 7, wherein said graphics system has a rendering mode in which said PROP packs 24 bit Z data without stencil data into tiles.

9. The graphics system of claim 8, wherein for said rendering mode said PROP packs 24 bit color data into tiles.

10. The graphics system of claim 7, wherein said graphics system has a rendering mode including a 24 bit Z rendering mode and said arrangement of data entries for coalesced Z data does not support an integer number of 24 bit Z entries, whereby allocating 24 bit Z data across successive coalesced entries improves packing efficiency.

11. The graphics system of claim 7, wherein for a first rendering mode an integer number of 32 bit pixel data entries is supported in a single tile and for a second rendering mode having 24 bit data entries, data for at least one pixel is split between successive tiles.

12. A method of organizing pixel data for use by a raster operations (ROP) stage, comprising:

receiving pixel data for a stream of pixels;

coalescing Z data into coalesced Z data entries with each entry having a first tile format to store Z data in a first contiguous region of memory wherein for a rendering mode in which said first tile format has a capacity that does not correspond to Z data for a whole number of pixels said coalescing Z data includes splitting Z data across entries to improve packing efficiency;

coalescing color data into coalesced color data entries with each having a second tile format to store color data in a second contiguous region of memory wherein for a rendering mode in which said second tile format has a capacity that does not correspond to color data for a whole number of pixels said coalescing color data includes splitting color data across entries to improve packing efficiency;

determining an ordering of Z data and color data selected to minimize breaking up pixel data between entries; and generating information for associating a data split between successive entries; and generating data to associate coalesced Z data entries with corresponding coalesced color data entries in subsequent processing and to associate any pixel data split across entries.

13. The method of claim 12, wherein for a 24 bit rendering mode 24 bit Z data without stencil data and 24 bit color data are packed into said tiled memory format, said tiled memory format not supporting an integer number of 24 bit data values such that pixel data for at least one pixel is split between successive tiles.

14. The method of claim 12, further comprising:

performing a Z-test operation upon coalesced Z data entries.

15. The method of claim 14, further comprising:

resolving visibility of coalesced Z data entries to generate a resolve signal.

16. The method of claim 15, further comprising;

utilizing said resolve signal in color write operations on corresponding coalesced color data entries.

17. The method of claim 16, further comprising utilizing a pointer to indicate said corresponding color data entries.

* * * * *